US009045064B2

(12) United States Patent
Weigert

(10) Patent No.: US 9,045,064 B2
(45) Date of Patent: Jun. 2, 2015

(54) NECK CUSHION

(75) Inventor: Norbert Weigert, Vilshofen-Rieden (DE)

(73) Assignee: GRAMMER AG, Amberg (DE)

( * ) Notice: Subject to any disclaimer, the term of this patent is extended or adjusted under 35 U.S.C. 154(b) by 562 days.

(21) Appl. No.: 13/215,978

(22) Filed: Aug. 23, 2011

(65) Prior Publication Data

US 2012/0062013 A1 Mar. 15, 2012

(30) Foreign Application Priority Data

Sep. 9, 2010 (DE) .......... 10 2010 044 830

(51) Int. Cl.
*A47C 7/36* (2006.01)
*B60N 2/48* (2006.01)
(52) U.S. Cl.
CPC ............ *B60N 2/4879* (2013.01); *B60N 2/4805* (2013.01)
(58) Field of Classification Search
USPC ......................................... 297/397, 220, 410
See application file for complete search history.

(56) References Cited

U.S. PATENT DOCUMENTS

| 2,591,306 | A | * | 4/1952 | Sherman | 297/284.5 |
| 6,030,034 | A | * | 2/2000 | Plohetski | 297/188.06 |
| 6,254,189 | B1 | * | 7/2001 | Closson | 297/397 |
| 6,807,696 | B2 | * | 10/2004 | Magistretti | 5/633 |
| 2009/0195036 | A1 | * | 8/2009 | Timmis | 297/256.17 |
| 2010/0301655 | A1 | * | 12/2010 | Mezger | 297/397 |

FOREIGN PATENT DOCUMENTS

| DE | 102004044243 A1 | 3/2006 |
| GB | 694567 A | 3/1951 |

OTHER PUBLICATIONS

Search Report prepared by the German Patent Office for German Application No. 102010044830.3-16 on Mar. 23, 2011.

* cited by examiner

*Primary Examiner* — David R Dunn
*Assistant Examiner* — Alexander Harrison
(74) *Attorney, Agent, or Firm* — Sheridan Ross P.C.

(57) ABSTRACT

The invention relates to neck cushions for vehicle seats, in particular for complete seats, for the support of the head and neck area of a person sitting on the seat, with a cushion, a counterweight and a fastening strap which connects the cushion to the counterweight, wherein the cushion rests on an upper region of the backrest in the longitudinal direction of the backrest so as to be adjustable at least in the longitudinal direction of the backrest, and the counterweight is arranged on at least one limiting element in order to limit the movement of the cushion.

2 Claims, 3 Drawing Sheets

NECK CUSHION

CROSS REFERENCE TO RELATED APPLICATIONS

This application claims the benefit of German Patent Application No. 102010044830.3 filed Sep. 9, 2010, the entire disclosure of which is incorporated herein by reference.

The present invention relates to a neck cushion for vehicle seats according to the preamble of claim 1.

The seats for the driver and front-seat passenger of a motor vehicle, as known from the generally known prior art, have at least one seat part, a backrest and a head support arranged at a distance from the backrest by means of two supports extending parallel in the vertical direction of the seat.

This head support is adjustable in the vertical direction of the seat and is also capable of being inclined in part in the longitudinal direction of the seat, in order to be able to carry out a setting of the head support, which corresponds at least approximately to the size and thus the sitting position of the driver or front-seat passenger, so that the latter can support his head on the head support.

There is usually, however, no additional neck support which would allow the head to rest on the head support, so that the neck area of the spinal column can assume an anatomically correct position or shape, in that the neck area can rest directly on a support in the same way as the head region.

Accordingly, DE 199 19 561 A1 describes a head support for a vehicle seat with an integrated, vertically adjustable neck support, where a vertically adjustable support profile, which—depending upon the positioning—widens towards the outside a sleeve of the head support capable of being resiliently widened, is arranged on the head support under the sleeve of the head support. In accordance with the prior art this head support can also be adjusted and inclined in its height with respect to the backrest on which it is arranged. With this, however, only a very limited area of the head and neck area of a passenger is capable of being supported by means of the neck support. If, for example, a person of above average size sits on this seat and sets the head support and the neck support into the uppermost position in the vertical direction of the seat, there no longer remains to this person any area of the head support on which he or she can rest his or her head. In addition, a neck support described in this way is not capable of being integrated or retrofitted in already existing seat systems, but always requires the complete exchange of the entire head support.

A neck support, which is capable of being retrofitted but which is not adjustable in the vertical direction of the seat, is described for example in DE 200 18 242 U1, which is inserted between the head support and the backrest and which has a support face bulging outwards.

Another system, which however is highly complex in its design, for the support of the neck area is described by DE 695 00785 T2, in which for example a cushion member is attached in a displaceable manner to a plate which is fastened with belts to the head support and the backrest of a seat. In this case the cushion member slides with a slide arranged at the rear side of the cushion member in a guide slot of the plate, at the edges of which is formed a set of teeth which engages in the toothed wheels arranged on the slide. The cushion member and the toothed wheels are pressed against the set of teeth by a spring, so that displacement of the cushion member is not possible. Only by stressing with a force counteracting the spring force is the cushion member released from this position and it can be displaced along the plate. A design of this type has a corresponding space requirement on the seat as well as in the vehicle as a whole and it does not form a neck support which is capable of being retrofitted and which is displaceable and which can be arranged unobtrusively on the vehicle seat already present in the vehicle.

In addition, the passenger seats of public means of transport, such as for example the railways or an aeroplane, which are usually designed in the form of complete seats, i.e. have a backrest and a head support which are not arranged at a distance from each other—in which case the head support is not also arranged in an adjustable manner with respect to the backrest in the vertical direction of the seat—are not usually provided with an additional neck support which is capable of being arranged and adjusted.

Consequently, DE 20 2009 007 937 U1 discloses a vertically adjustable neck support for complete seats, which has a covering, which covers at least the head and neck region of the seat already present, as well as a vertically adjustable support pad and a magnetic join or a hook-and-loop join which is arranged between the covering and the support pad and with which the support pad can be fastened at different heights on the covering. In order to use this neck support it is therefore always necessary to select the covering—matching the size and shape—for the seat to be covered. In addition, if the passenger or the driver wishes to adjust the neck support, he or she must always first remove the cushion from the covering and then attach it thereto again, for which both hands as well as a twisting of the passenger from his or her sitting position in the direction of the backrest are usually necessary. In addition, the hook-and-loop join can quickly become soiled and matted, as a result of which the cushion can no longer be arranged on the covering in a lasting manner.

Accordingly, the object of the present invention is to make available a neck cushion for vehicle seats, in particular for complete seats, which has a simple design and, as a result, is inexpensive to produce and simple to use and which is quickly adjustable along the backrest in order to offer each passenger or driver or front-seat passenger the possibility of supporting his or her head and neck in a position with an anatomically correct shape.

This object is attained by the present invention by means of a neck cushion for vehicle seats according to claim 1.

Accordingly, a neck cushion for vehicle seats, in particular for complete seats in air or rail travel, for the support of the head and neck area of a person or passenger sitting on the seat has a cushion, a counterweight and a fastening strap which connects the cushion to the counterweight, in which case the cushion rests on an upper region of the backrest in the longitudinal direction of the backrest so as to be adjustable at least in the longitudinal direction of the backrest, and the counterweight is arranged on at least one limiting element in order to limit the movement of the cushion.

In this case a passenger is to be understood as being either a driver or vehicle operator, a front-seat passenger, or a co-driver, or a person who is conveyed by a means of transport, whether guided on tracks or with tyres, or of air travel.

The vehicle seat, or the driver's seat or the passenger seat or the complete seat or the seat, has a backrest, a seat part and a head support or a head support area.

In this case the cushion, which is designed for example in the form of a neck lordosis cushion, preferably has on one side a region which is curved outwards and which is adapted at least locally to the shape of the neck area when the passenger or the traveller or the person sitting on the seat supports his or her head on the head region of the seat.

In this way, an orthopaedically or anatomically correct positioning of the cervical vertebrae is made possible, in order to allow the passenger a pleasant and complaint-free sitting experience even over a prolonged period.

In this case the cushion is capable of being deformed for example in a resilient or even plastic manner and it is filled with a particle or granulate material which yields slightly under the action of compressive force, so that the cushion can be adapted at least in part to the shape of the vertebral column or in the region of the cervical vertebrae.

In addition, the cushion can be displaced along the backrest, so that a passenger of above average size or even below average size can use the cushion equally readily.

The cushion is arranged on the seat only by means of a fastening strap which is fastened at one end to the cushion and at the other end to a counterweight and which is placed over the upper end of the seat. In addition, the cushion is positioned in the position thereof defined by the passenger on the front side of the backrest, i.e. the side on which the passenger rests by means of the counterweight which is arranged on the rear side of the backrest. In this case the counterweight preferably has a weight identical to the cushion. It is also possible, however, for the counterweight to be heavier than the weight of the cushion, in which case—as a result of the frictional force which is exerted by the seat upon the fastening strap—the cushion is nevertheless not continuously drawn upwards in the longitudinal direction of the backrest.

It is possible for the fastening strap to be arranged on the cushion and/or the counterweight by means of a releasable join, so that the component parts of the neck cushion can be detached from one another in a simple manner so as possibly to be able to replace individual damaged or soiled component parts in a simple manner.

In this case these detachable joins can be formed by all the joins known from the prior art, such as for example hook-and-loop joins, welded joins, zip fastener joins etc.

The counterweight can be for example a metallic element which is sewn into a pocket of the fastening strap.

Alternatively, it is a defined quantity of materials like grains of sand which result in a defined weight on account of their quantity and are likewise sewn for example into a pocket of the fastening strap or are arranged in a captive manner.

In this case the shape and filling of the cushion and of the counterweight should not be restricted to a defined shape and filling, but rather it should be assumed that any shapes and fillings known from the prior art can be used. The same applies for example to the material composition of the fastening strap.

On account of this simple design with only three component parts the neck cushion is simple to produce and can be removed from a vehicle seat in a simple manner and can be arranged on another vehicle seat.

In this way for example, a passenger who does not wish to use the neck cushion according to the invention can remove the neck cushion in a rapid and uncomplicated manner from its seat and can stow it in a space-saving manner.

In addition, the neck cushion can be displaced in a very quick and simple manner from one position into another position, preferably along the longitudinal direction of the backrest. This is advantageous for example when the passenger initially present in a position sitting upright, i.e. the backrest extends substantially at a right angle to the seat area, inclines the backrest with respect to the seat area, in order to occupy a substantially recumbent position in this way. In this case of the passenger or the backrest reclining, the sitting position of the passenger is also altered in such a way that he or she slips a little further downwards in the longitudinal direction of the backrest and forwards in the longitudinal direction of the seat. If the passenger remains in a position in this case in which the neck area of the passenger touches the cushion, then, if he slips along the backrest, he will automatically pull the cushion or the neck cushion as a whole downwards, i.e. downwards in the longitudinal direction of the backrest.

In the same way a simple and rapid adjustment of the cushion upwards in a longitudinal direction of the backrest is possible, provided that the passenger remains in an upright position on the vehicle seat during the adjustment procedure of the backrest, in such a way that his or her neck area rests against the cushion and the cushion is thus pushed slightly upwards.

On account of the cushion being pushed upwards in the longitudinal direction of the backrest in this way, the static friction between the seat and the fastening strap resting on it is counteracted or reduced. On account of the tensile force then exerted by the counterweight upon the fastening strap, which force occurs as a result of the force of gravity, the strap is slowly pulled over the seat area on which it rests and in this way it also pulls the cushion upwards in the longitudinal direction of the backrest.

The passenger, however, is not free to rest his neck on the cushion and his head on a head region of the seat, but to support his head on the cushion, so as for example to produce in this way a posture of the head which is desired by the passenger and which is helpful to him when reading for example.

On grounds of safety it is advantageous if the counterweight is fastened on the vehicle seat or the seat in such a way that in the event of an accident for example the counterweight will not injure the passenger sitting on the seat and also the other passengers present in the vicinity of the seat.

Furthermore, it is necessary to prevent a passenger from being inadvertently injured by the counterweight if he for example inadvertently pushes the neck cushion or the cushion too far downwards in the longitudinal direction of the backrest, as a result of which the counterweight can slip over the backrest region of the seat and thus reaches the front face of the backrest against which for example a passenger is already resting and is hit on the head by the slipping counterweight.

To this end it is preferable for at least one limiting element to be arranged on the seat, which limiting element is intended to prevent an inadvertent release of the neck cushion from the seat, but is also intended at the same time to permit an intentional removal of the neck cushion.

For this, in a preferred embodiment the limiting element is arranged on the rear side of the backrest of the vehicle seat, so that the sitting comfort of the passenger sitting on the seat is not adversely affected by this fastening element.

In order to fasten the neck cushion to the seat and preferably to the rear side of the backrest of the seat, four possibilities or variants are set out and described below:

First Variant/Embodiment

In a first variant it is possible for the limiting element to be a substantially non-resilient strap which extends substantially in the lateral direction of the seat and which is fastened to a cover or to a covering of the rear side of the backrest by means of clips.

To this end the strap rests directly, at least locally, on the rear side of the backrest and it is arranged above the counterweight in the longitudinal direction of the backrest and it is an upper limit for the counterweight in the longitudinal direction of the backrest.

The strap is consequently stretched on the rear side of the backrest in the lateral direction of the seat by these clamps and is locked by the clips, in which case it is also possible for other fastening elements to be used, so that for example slipping of the strap is prevented.

Since the strap is essentially non-resilient it cannot be inadvertently altered in its extension. As a result, the counterweight which is limited by this strap in its movement directed upwards in the longitudinal direction of the backrest cannot be pushed through the space or interspace which is present at the margin at least locally and which is formed between the strap and the surface of the rear side of the backrest. In this way, an inadvertent removal of the neck cushion from the seat is prevented at the same time.

It is possible for the clamps for the passenger to be attached in a releasable manner to the seat, so that the passenger can completely remove the neck cushion as a whole from the seat, or in a non-releasable manner to the seat, so that for example the passenger is given the opportunity, however, of turning the cushion in the direction of the rear side of the backrest if he or she has no need for a neck cushion at this moment.

Second Variant/Embodiment

In accordance with a second variant the limiting element is preferably a knob-like engagement element arranged in a stationary manner on the rear side of the backrest and with a spacer member and a knob-like head arranged on the spacer member.

Accordingly, the engagement element preferably comprises at least two portions joined to each other, namely the spacer member, which has a shape substantially in the form of a bar or a rod and consequently two base faces and at least one outer face, and a head which preferably has two sides, namely a plane side and a convex side opposite the latter. It is also possible, however, for the two sides to be made plane or convex.

The head is preferably arranged on the spacer member in such a way that one base surface of the spacer member rests against one side of the head or is connected to it in a non-releasable manner. The other base surface of the spacer member is connected to a region of the rear side of the backrest or the cover thereof in a preferably non-releasable manner.

It is also possible, however, for the engagement element to be arranged for example on the rear side of the backrest and/or or on the head so as to be releasable by means of a screw fastening and so, in the event of damage, it can simply be unscrewed.

The spacer member extending substantially at a right angle from the rear side of the backrest passes through a guide opening extending substantially in the longitudinal direction of the fastening strap, the fastening strap being arranged between the rear side of the backrest and the head.

This guide opening forms a sort of button hole which either can be turned over the head of the engagement element during the assembly procedure when the engagement element is connected to the rear side of the backrest in a non-releasable manner, or through which the spacer member can be guided before it is screwed for example into the rear side of the backrest.

In order that the fastening strap cannot be detached from the engagement element or can slip off from the engagement element in an undesired manner, the head has a length extending in the lateral direction of the seat or a diameter which is greater than the width of the guide opening.

Third Variant/Embodiment

In accordance with a third variant the limiting element is preferably a rail system extending in the longitudinal direction of the backrest and arranged on the rear side of the backrest and having two guide rails.

In this case the guide rails preferably situated opposite with the guide grooves are orientated substantially parallel to each other and, in accordance with a preferred embodiment, they have guide elements which are arranged in a manner sliding or rolling in the guide rails in the longitudinal direction of the backrest and connected to the counterweight.

These guide elements can constitute for example resilient or even non-resilient straps with a metallic or ceramic sliding element or a roller, in which case the straps are connected either to the counterweight in a releasable or non-releasable manner or to the fastening strap of the neck cushion in a direct manner.

The guide elements and consequently also the sliding elements or rollers are likewise moved in the guide rails in the longitudinal direction of the backrest by a movement of the neck cushion, in which case the sliding elements or rollers preferably slide or roll in the grooves in the guide rail.

In addition, it is possible for the guide rails to be designed in the form of U-shaped elements which enclose the ends of the counterweight situated essentially in the lateral direction of the seat, in such a way that the counterweight can slide in the guide rails.

Consequently, in this case no additional guide elements are required, since the counterweight itself acts as a guide element or sliding element.

Irrespectively of whether guide elements are used or not, the guide rails are preferably provided at an upper and a lower end in each case with holding elements which prevent the guide elements or the counterweight respectively from moving out of the guide rails. Accordingly, these holding elements result in the limitation of the movement of the counterweight and consequently of the neck cushion as a whole, in which case, however, the guide rails preferably extend over the entire length of the rear side of the backrest, in order to ensure an adequate movement of the neck cushion.

In this way, the holding elements prevent the guide elements or the counterweight respectively from sliding out of these guide rails in an undesired or unintentional manner, as a result of which a possible injury to the passenger sitting on the seat and to the passengers present in the vicinity of the seat is prevented.

It is additionally possible for at least the upper or the lower holding elements to be made releasable from the guide rail, in order to allow the guide elements or the counterweight respectively to be removed from the guide rails. In this way, for example, a passenger can remove the neck cushion from the seat himself if he has no need for it.

Fourth Variant/Embodiment

In accordance with a fourth variant the limiting element is a strap which is resilient at least locally and which extends on the rear side of the backrest substantially in the longitudinal direction of the backrest and is arranged with an upper end on the counterweight and with a lower end on a lower region of the vehicle seat.

Consequently the strap is stretched upwards in the longitudinal direction of the backrest as a result of a movement of the cushion directed downwards in the longitudinal direction of the backrest, in order to give way to the movement of the cushion at least for a time or to permit this movement of the cushion.

When the cushion is pushed upwards again in the longitudinal direction of the backrest, the strap is pulled together again.

In this case the strap is arranged for example in a releasable manner on a lower region of the backrest in the longitudinal direction of the backrest and/or in a releasable manner on the counterweight or the fastening strap of the neck cushion, so that the passenger has the possibility of removing the neck cushion from the seat.

Instead of the resilient strap, additional embodiments are also possible, such as for example a spiral spring.

Further advantages, aims and properties of the present invention are explained with reference to the following description of the accompanying drawing, in which an embodiment of the neck cushion according to the invention and the variants of arrangement and fastening of the neck cushion according to the invention are illustrated by way of example.

Components which correspond at least substantially with respect to their function in the figures can be designated with the same references in this case, it being unnecessary for these components to be designated and explained in all the figures.

In the figures

Figure 1:
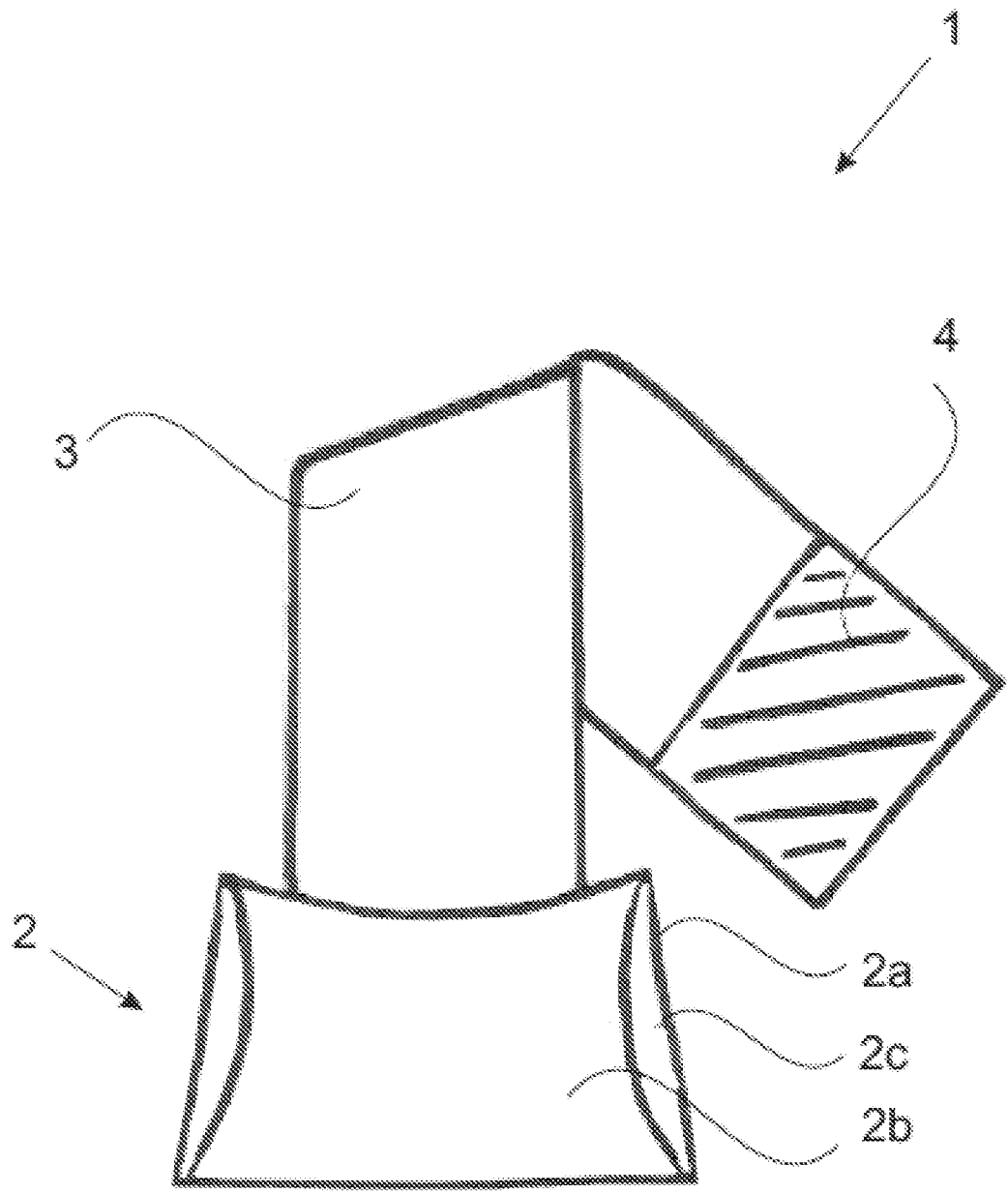
FIG. 1 is an outline drawing of an embodiment of the neck cushion according to the invention.

FIG. 1 is an outline drawing of an embodiment of the neck cushion 1 according to the invention with a cushion 2, a fastening strap 3 and a counterweight 4. In this case the fastening strap 3 constitutes the connecting member between the cushion 2 and the counterweight 4 and it has a length which allows it to be able to displace the cushion 2 over a wide area in the longitudinal direction of the backrest.

In this case the counterweight 4 is an element which is designed in the manner of a plate or bar and is inserted in a pocket (not shown here) formed at one end of the fastening strap 3, in such a way as to prevent the counterweight 4 from slipping out in an unintentional manner. It is also possible for the counterweight 4 to be designed in the form of a sort of sandbag, in which case substances or materials similar to grains of sand are likewise introduced into a sort of pocket of the fastening strap 3.

The cushion 2 preferably has a rear side 2a, which is made plane and which rests directly against the backrest of the seat, as well as opposite it a front side 2b, which is made convex at least in part and which corresponds substantially to the curvature of the neck area of a passenger, as well as two lateral side regions 2c.

In this case the lateral sides 2c extend for example further forward from the plane rear side 2a of the cushion than the middle region of the front side 2b of the cushion situated between the lateral sides 2c. On account of this inwardly directed U-shaped course of the front side of the cushion from one lateral side 2c to the other lateral side 2c the cushion 2 is preferably positioned around a rear area of the neck, so as also to be able to stabilize it laterally in this way. It is also possible, however, for the cushion 2 to have a shape differing from the shape described above, in which case, however, it is not necessary to go into all the possible designs of the cushion 2 explicitly.

Figures 2, 3:
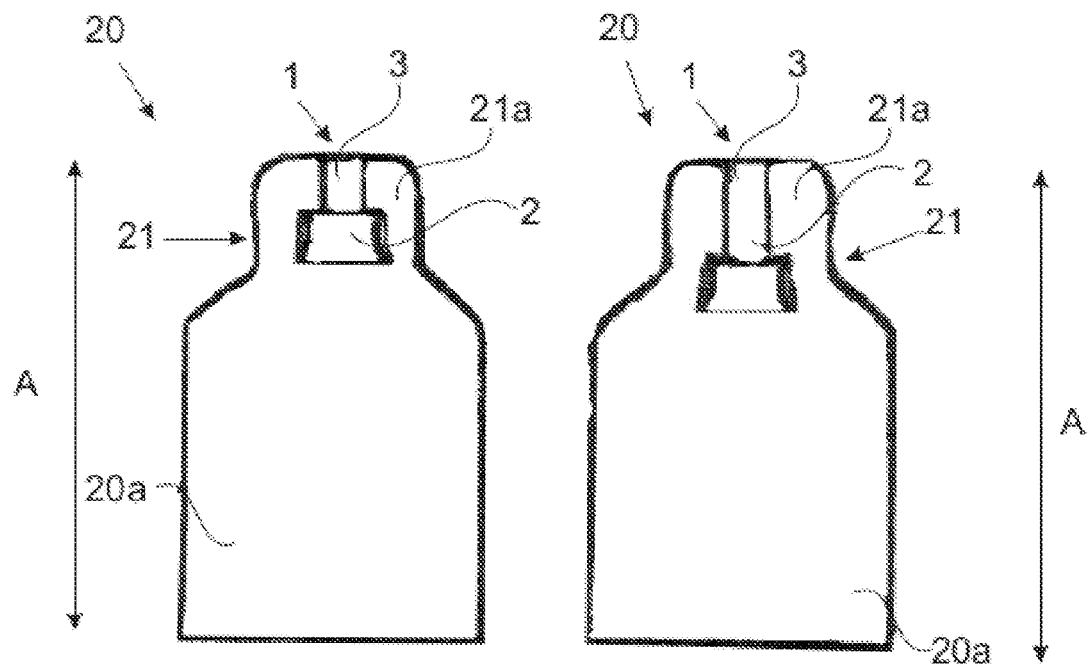
FIG. 2 is an outline drawing of a front side of the backrest with an embodiment of the cushion of the neck cushion according to the invention positioned at the top.
FIG. 3 is an outline drawing of a front side of the backrest with an embodiment of the cushion of the neck cushion according to the invention positioned at the bottom.

An outline drawing of a front view of the backrest with an embodiment of the neck cushion 1 according to the invention arranged on the backrest 20 is shown in FIG. 2, in which case the cushion 2 is situated in an upper region of the backrest 20 in the longitudinal direction A of the backrest.

In this case the longitudinal direction A of the backrest is orientated in each case to the inclination of the backrest 20 to the seat part of the seat (not shown here) and thus corresponds for example to a straight line extending substantially orthogonally from a seat part of the seat or from a surface of the vehicle floor (not shown here) when the backrest 20 is present in an upright position and consequently likewise extends upwards substantially orthogonally from the seat part.

Accordingly the longitudinal direction A of the backrest corresponds for example to a straight line (not shown here) parallel to a seat part of the seat when the backrest 20 has occupied a position inclined towards the rear, in such a way that the latter is orientated substantially parallel to the seat part or the surface of the vehicle floor.

In accordance with FIG. 2 the cushion 2 is situated in an upper region of the backrest 20 in the longitudinal direction A of the backrest or in an upper region of the head region 21, so that for example a passenger of above average size has the possibility of resting his neck on the cushion 2 and his head on the head support face 21a.

Figures 4, 5:
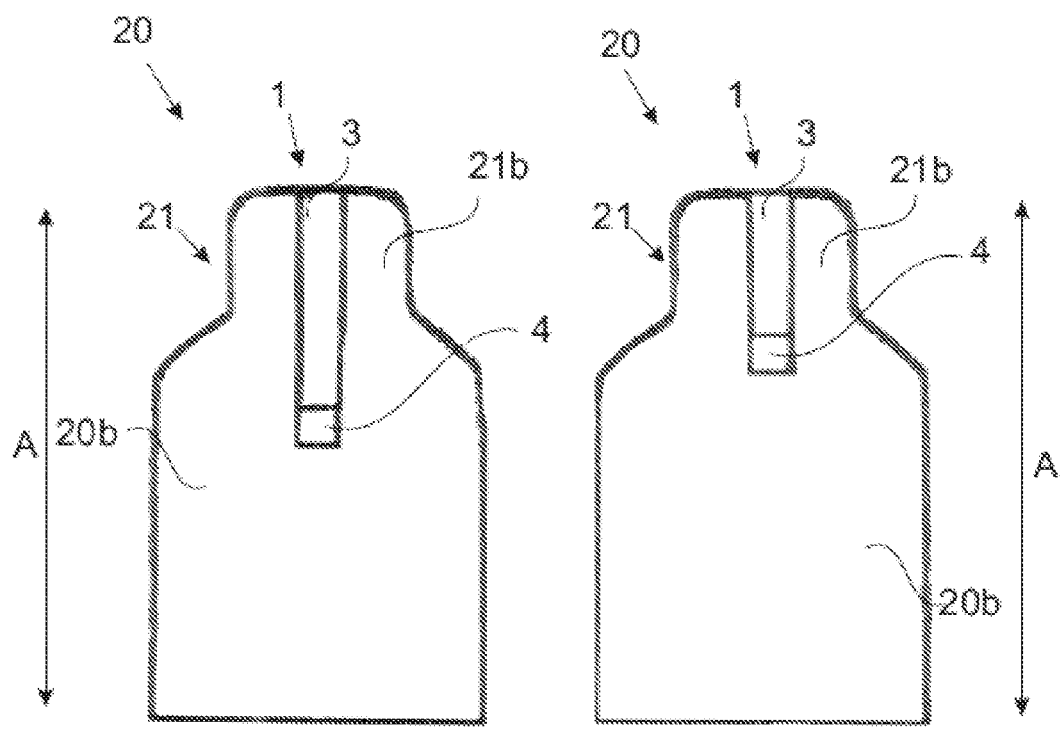
FIG. 4 is an outline drawing of a rear side of the backrest with an embodiment of the counterweight of the neck cushion according to the invention positioned at the bottom.
FIG. 5 is an outline drawing of a rear side of the backrest with an embodiment of the counterweight of the neck cushion according to the invention positioned at the top.

Accordingly, as shown in FIG. 4 in which an outline drawing of a rear side 20b of the backrest with an embodiment of the neck cushion 1 according to the invention arranged on the backrest 20 is shown, the counterweight 4 is situated in a lower region of the rear side 21b of the head region in the longitudinal direction A of the backrest. This means that the greater part of the fastening strap 3 is situated on the rear side 20b of the backrest.

FIG. 3 is an outline drawing of a front side 20a of a backrest 20 with an embodiment of the neck cushion 1 according to the invention arranged on the backrest 20, in which case the cushion 2 is situated in a lower region of the head support face 21a in the longitudinal direction A of the backrest.

In this example the neck cushion 1 as a whole is accordingly pulled down from an upper region of the backrest 20 in the longitudinal direction A of the backrest, as shown in FIG. 2, by a defined path in the longitudinal direction A of the backrest.

As a result, as shown in FIG. 5 in which an outline drawing of a rear side 20b of a backrest 20 with an embodiment of the neck cushion 1 according to the invention arranged on the backrest 20 is shown, the counterweight 4 is likewise pulled from a lower region of the rear side 21b of the head region in the longitudinal direction A of the backrest, as shown in FIG. 4, into an upper or middle region of the rear side 21b of the head region. Consequently the fastening strap 3 is present substantially in equal measure on the front side 20a of the backrest and the rear side 20b of the backrest.

It is also possible, however, for the cushion 2 to be pulled still further into the lower region of the backrest 20 in the longitudinal direction A of the backrest, as a result of which the fastening strap 3 rests for the greater part on the front side 20a of the backrest.

Consequently a passenger of below average size is given the possibility of resting his or her neck on the cushion 2 and his or her head on a region of the head support face 21a.

Figure 6:
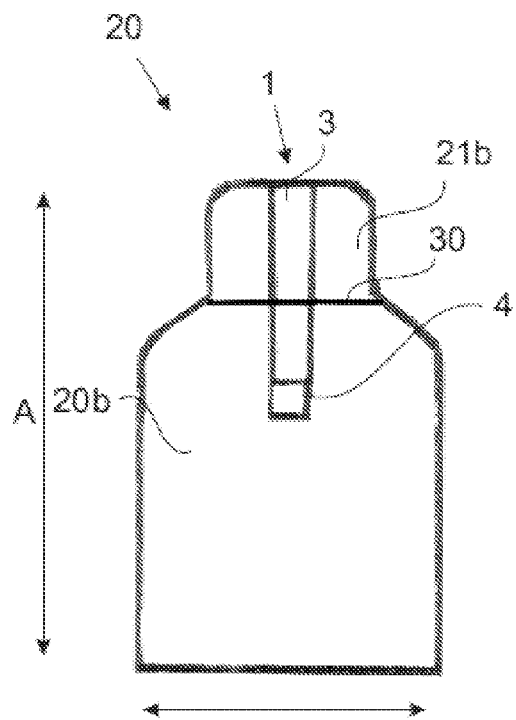
FIG. 6 is an outline drawing of a rear side of a backrest with a first embodiment of the limiting element.

FIG. 6 is an outline drawing of a rear side 20b of a backrest 20 with a first embodiment of the limiting element 30 for limiting the movement of the cushion 2 or the counterweight 4 respectively.

The substantially non-resilient strap 30 is stretched in the lateral direction B of the seat from one lateral end of the backrest 20 to the other lateral end of the backrest 20 and is fastened for example to a cover (not shown here) of the rear side 20b of the backrest with clips (not shown here) or other fastening elements on the rear side of the backrest.

In this case the strap 30 is preferably arranged in a lower region of the rear side 21b of the head region and consequently limits the movement of the counterweight 4 upwards in a longitudinal direction A of the backrest.

Since the distance between the rear side 20b of the backrest and the strap 30 is negligible, neither the counterweight 4 nor the cushion 2 can be pulled through this interspace. Only the fastening strap 3 has a sufficiently thin thickness or height to be able to slide through between the rear side 20b of the backrest and the strap 30.

Figure 7:
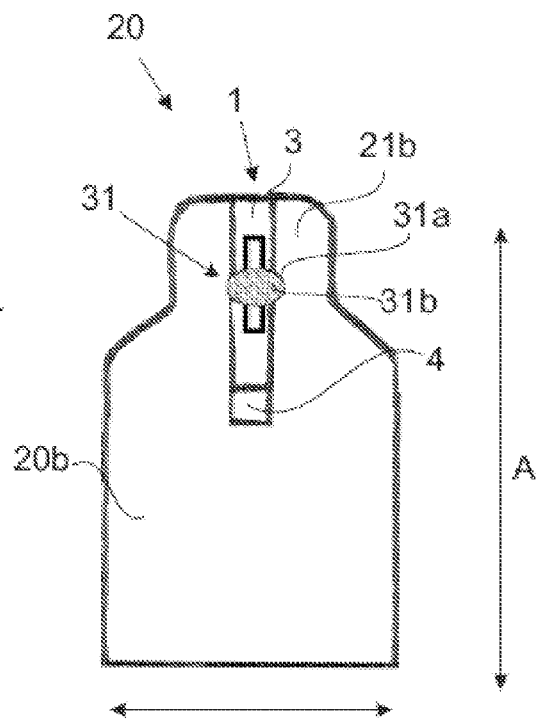
FIG. 7 is an outline drawing of a rear side of a backrest with a second embodiment of the limiting element.

FIG. 7 is an outline drawing of a rear side 20b of a backrest 20 with a second embodiment of the limiting element 31 which is a guide element 31 with a head 31a and a spacer member (not shown here).

The guide element 31 extends substantially at a right angle or perpendicularly from the rear side 20b of the backrest to the outside, one end of the spacer member being connected in a releasable or non-releasable manner to the rear side 20b of the backrest or to a covering of the rear side (not shown here) of the backrest. A head 31, which has the task of fixing the fastening strap on the rear side 20b of the backrest in a displaceable manner in the longitudinal direction A of the backrest, is arranged on the other side of the spacer member.

The fastening strap has a guide slot 32 or a guide opening 32 which extends in the longitudinal direction A of the backrest and through which the spacer member of the guide element 31 passes. In this way, by means of the guide opening 32, the fastening strap 3 can slide along the spacer member in the longitudinal direction A of the backrest as far as one of the ends of the guide opening 32 is reached.

As a result, an adequate adjustment of the cushion (not shown here) on the front side (not shown here) of the backrest in the longitudinal direction A of the backrest is possible.

The head 31a can have widely differing shapes, in which case, however, the width thereof extending in the lateral direction B of the seat has to be greater or longer than the width of the guide opening 32, so as to prevent an inadvertent detachment of the strap 3 from the guide element 31.

In this embodiment the head has an oval shape in the manner of a knob, which has a plane underside (not shown here) and a top side 31b, which is shown in broken lines here and which is plane or curved in a convex manner.

Figure 8:
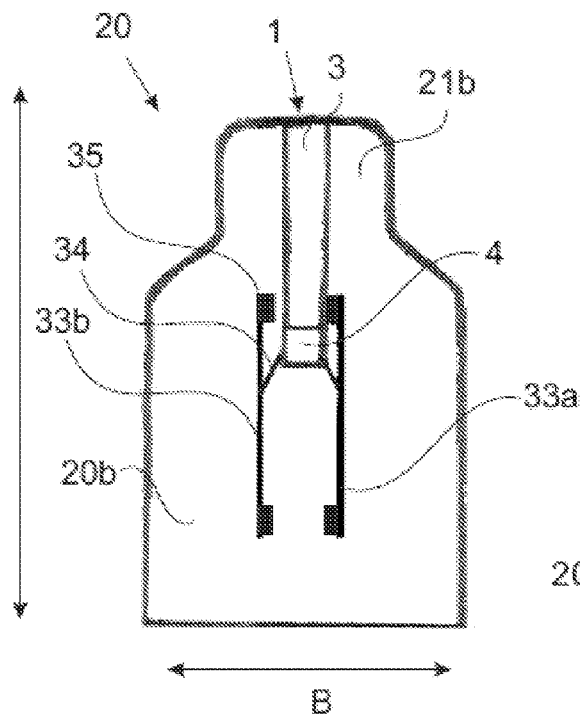
FIG. 8 is an outline drawing of a rear side of a backrest with a third embodiment of the limiting element.

FIG. 8 is an outline drawing of a rear side 20b of a backrest 20 with a third embodiment of the limiting element 33 which is a rail system 33 with two guide rails 33a and 33b arranged at a distance parallel to each other in the lateral direction B of the seat and extending along the rear side 20b of the backrest in the longitudinal direction A of the backrest.

In this case the counterweight 4 is arranged between the guide rails 33a, 33b and is guided in this case in the longitudinal direction A of the backrest by guide elements 34, which in each case comprise for example a strap and a sliding element or rollers movable in a sliding or rolling manner in the guide rail, in the guide rails 33a, 33b which for example have a guide groove (not shown here).

Furthermore, each guide rail 33a, 33b has a holding element 35 at the upper and lower end in the longitudinal direction A of the backrest in order to prevent the guide elements 34 from sliding out of the guide rails 33a, 33b.

In this case these holding elements 35 can be made releasable in a simple manner in order to allow the neck cushion 1 or specified component parts of the neck cushion 1 to be replacement.

Figure 9:
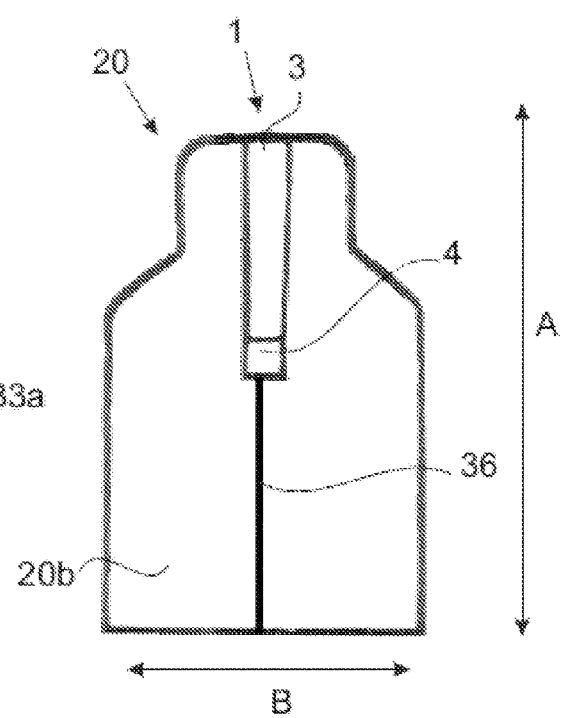
FIG. 9 is an outline drawing of a rear side of a backrest with a fourth embodiment of the limiting element.

An outline drawing of a rear side 20b of a backrest 20 with a fourth embodiment of the limiting element 36, which is a resilient strap 36 or tie strap 36, is shown in FIG. 9.

The strap 36 extends in the longitudinal direction A of the backrest from a lower region of the rear side 20b of the backrest as far as the counterweight 4 in order to limit the movement—directed upwards in the longitudinal direction A of the backrest—of the counterweight 4 or to fasten the counterweight 4 to the seat (not shown here) or the backrest 20 respectively in such a way that the counterweight 4 should not be detached from the backrest 20 in an undesired manner even in the event of an accident and could injure a passenger sitting on the seat or a passenger present in the vicinity of the seat.

In thus case the strap 36 is connected by fastening elements (not shown here) in either a releasable or a non-releasable manner to the backrest and to the counterweight.

Furthermore, the strap 36 is dimensioned in such a way that it exerts no tensile force upon the counterweight 4 or upon the neck cushion 1 respectively at least locally, as a result of which a change in the position of the neck cushion 1 is possible without any effort on the part of the passenger.

The Applicant claim all the features disclosed in the application documents as being essential to the invention, insofar as they are novel either individually or in combination as compared with the prior art.

LIST OF REFERENCES 1 neck cushion
2 cushion
2a rear side of the cushion
2b front side of the cushion
2c lateral sides
3 fastening strap
4 counterweight
20 backrest
20a front side of the backrest
20b rear side of the backrest
21 head region
21a head support face
21b rear side of the head region
30 strap (limiting element)
31 guide element (limiting element)
31a head
31b top side of the head
32 guide opening
33 rail system (limiting element)
33a first guide rail
33b second guide rail
34 guide elements
35 holding elements
36 resilient strap (limiting element)
A longitudinal direction of the backrest
B lateral direction of the seat

The invention claimed is:

1. A neck cushion for vehicle seats for the support of the head and neck area of a person sitting on the seat, with a cushion, a counterweight, which is arranged on the rear side of the backrest, and a fastening strap which connects the cushion to the counterweight and which is placed over the upper end of the seat, wherein the cushion rests on an upper region of the backrest in the longitudinal direction of the backrest so as to be adjustable at least in the longitudinal direction of the backrest, and wherein the counterweight is arranged to contact at least one limiting element in order to limit the movement of the cushion and to prevent an inadvertent release of the neck cushion from the seat, wherein the limiting element is arranged on a rear side of the backrest of the vehicle seat, wherein the limiting element is a substantially non-resilient strap which extends substantially in the lateral direction of the seat and which is fastened to a covering or to a cover of the rear side of the backrest by means of clips.

2. The neck cushion according to claim 1, wherein the non-resilient strap rests directly on the rear side of the backrest at least locally and it is arranged above the counterweight in the longitudinal direction of the backrest and it is an upper limit for the counterweight in the longitudinal direction of the backrest.

* * * * *